United States Patent
Ma

(10) Patent No.: US 11,554,548 B1
(45) Date of Patent: Jan. 17, 2023

(54) INTEGRATED BOX-TYPE 3D PRINTING DEVICE WITH A FOLDABLE PRINTER BODY

(71) Applicant: Shanghai Yannuo Building Material Co., Ltd., Shanghai (CN)

(72) Inventor: Yihe Ma, Shanghai (CN)

(73) Assignee: Shanghai Yannuo Building Material Co., Ltd., Shanghai (CN)

(*) Notice: Subject to any disclaimer, the term of this patent is extended or adjusted under 35 U.S.C. 154(b) by 0 days.

(21) Appl. No.: 17/535,504

(22) Filed: Nov. 24, 2021

(51) Int. Cl.
| | | |
|---|---|---|
| *B29C 64/236* | (2017.01) | |
| *B29C 64/232* | (2017.01) | |
| *B29C 64/118* | (2017.01) | |
| *B29C 64/25* | (2017.01) | |
| *B33Y 30/00* | (2015.01) | |

(52) U.S. Cl.
CPC .......... *B29C 64/236* (2017.08); *B29C 64/118* (2017.08); *B29C 64/232* (2017.08); *B29C 64/25* (2017.08); *B33Y 30/00* (2014.12)

(58) Field of Classification Search
CPC ... B29C 64/118; B29C 64/232; B29C 64/236; B29C 64/25; B33Y 30/00
See application file for complete search history.

(56) References Cited

U.S. PATENT DOCUMENTS

| | | | | |
|---|---|---|---|---|
| 2015/0140158 | A1* | 5/2015 | Cervantes | B29C 64/25 |
| | | | | 312/327 |
| 2017/0021527 | A1* | 1/2017 | Grivetti | E04G 21/0436 |
| 2017/0036399 | A1* | 2/2017 | Cheung | B29C 64/393 |
| 2017/0173890 | A1* | 6/2017 | Choi | B33Y 30/00 |
| 2018/0230703 | A1* | 8/2018 | Ma | B28B 1/001 |
| 2018/0311895 | A1* | 11/2018 | Budmen | A23P 30/20 |
| 2021/0206074 | A1* | 7/2021 | Lee | B29C 64/25 |

FOREIGN PATENT DOCUMENTS

| | | | | |
|---|---|---|---|---|
| CN | 108284602 A | * | 7/2018 | .......... B29C 64/232 |
| CN | 108621428 | * | 10/2018 | ............ B29C 64/20 |
| CN | 110815813 | * | 2/2020 | .......... B29C 64/118 |

* cited by examiner

*Primary Examiner* — Manley L Cummins, IV
(74) *Attorney, Agent, or Firm* — WHGC, P.L.C.; Alexander R Schlee

(57) ABSTRACT

An integrated box-type 3D printing device, having a support structure, a first bracket, a second bracket, and a printer body. The first bracket is movable back and forth in a first direction on the support structure. The printer body is arranged on the second bracket. The second bracket is movable back and forth in a second direction relative to the first bracket. The printer body is movable back and forth in a third direction on the second bracket. The support structure is provided with an accommodating space for accommodating the second bracket. The second bracket is foldable in the opposite direction to the third direction so that the second bracket is foldable into the accommodating space so that the integrated box-type 3D printing device assumes a transport and storage configuration when the second bracket is folded into the accommodating space.

8 Claims, 8 Drawing Sheets

INTEGRATED BOX-TYPE 3D PRINTING DEVICE WITH A FOLDABLE PRINTER BODY

FIELD OF THE INVENTION

The present invention belongs to the technical field of 3D printing machinery, in particular to an integrated box-type 3D printing device and system.

BACKGROUND OF THE INVENTION 3D printing is a new type of rapid additive manufacturing technology, which can accurately print the electronic blueprint with consumables, and has the advantages of rapid molding, less pollution, saving materials and high quality of molded products. A more recent development in 3D printing is creating buildings or other structures by 3D printing in the field of construction. At present, this technology is becoming more and more mature in the field of construction works.

In order to meet the requirements of printing head movement in three-dimensional space, the traditional 3D printing equipment generally adopts a Cartesian coordinate system or a parallel arm structure, and they both need three degrees of freedom of movement, which requires three sets of sliding devices. The bulky 3D printer makes it difficult to transport, costly and cumbersome to install on site.

SUMMARY OF THE INVENTION

According to an aspect of the invention an integrated box-type 3D printing device is provided, comprising: a support structure; a first bracket; a second bracket; and a printer body; wherein the first bracket is movable back and forth in a first direction on the support structure; the printer body is arranged on the second bracket; the second bracket is movable back and forth in a second direction relative to the first bracket; the printer body is movable back and forth in a third direction on the second bracket; the support structure is provided with an accommodating space for accommodating the second bracket; and the second bracket is foldable about an axis parallel to the first direction so that the second bracket is foldable into the accommodating space so that the integrated box-type 3D printing device assumes a transport and storage configuration when the second bracket is folded into the accommodating space.

DETAILED DESCRIPTION OF THE INVENTION

Figure 1:
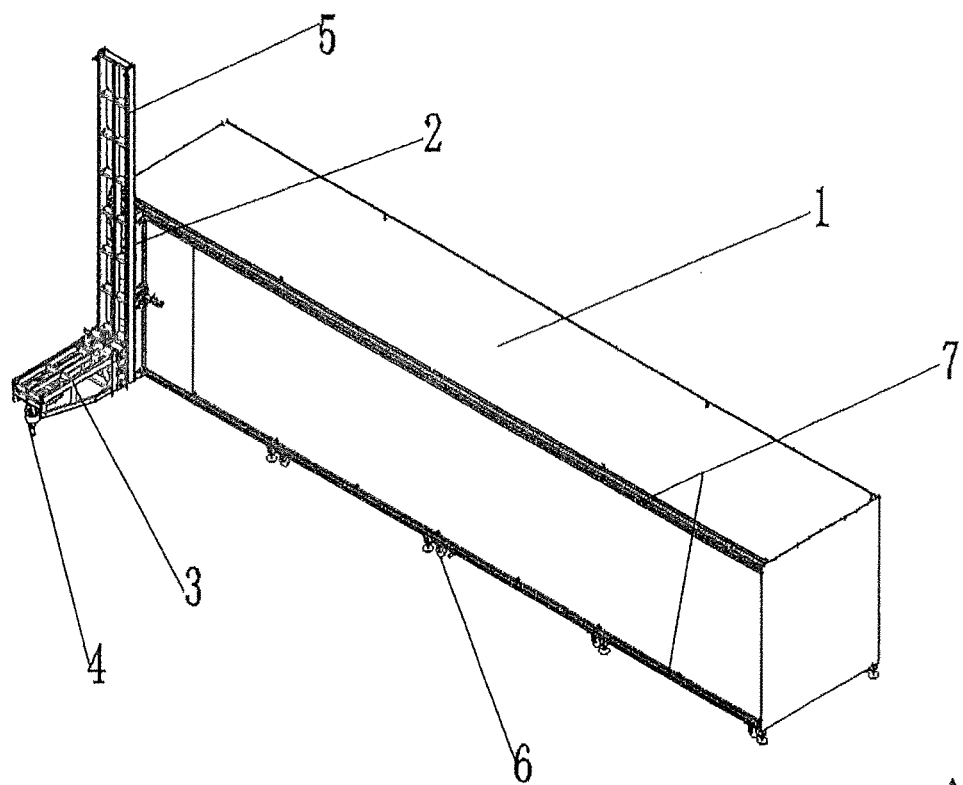
FIG. 1 is a schematic structural diagram of an integrated box-type 3D printing device provided by an embodiment of the present invention in the use state.
Figure 1:
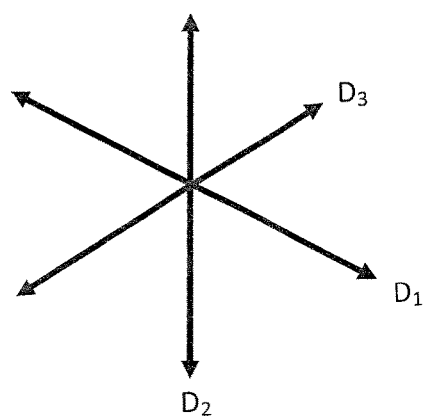

The main purpose of the present invention is to provide an integrated box-type 3D printing device and system. The integrated box-type 3D printing device and system can be folded during transportation, saving space, facilitating transportation, and reducing the time and workload of waiting and handling.

The present invention is realized by the following technical effects:

According to the first aspect of the present invention, an integrated box-type 3D printing device is provided, which comprises a support structure, a first bracket, a second bracket and a printer body. The first bracket can move along a first direction on the support structure, the printer body is arranged on the second bracket, the second bracket can move along a second direction relative to the first bracket, the printer body can move along a third direction on the second bracket, the support structure is provided with a space for accommodating the second bracket, the second bracket can be folded about an axis parallel to the first direction so that the second bracket can be placed in the accommodating space, the second direction is perpendicular to the first direction, and the third direction is perpendicular to the first direction.

The integrated box-type 3D printing device as described above further comprises a third bracket that has a first length and a second length, the first length of the third bracket being longer than the second length of the third bracket, wherein the first length of the third bracket is longer than the first length of the first bracket, when the integrated box-type 3D printing device is used, the first length of the third bracket is parallel to the second direction, and when the integrated box-type 3D printing device is stored or transported, the first length of the third bracket is parallel to the first direction.

According to the integrated box-type 3D printing device as described above, the support structure further comprises a roller and a fixed base, wherein both of the roller and the fixed base are arranged at the bottom of the support structure.

The integrated box-type 3D printing device as described above further comprises a feeding system, wherein the support structure is a box-type structure, and the feeding system is arranged in the box-type structure.

According to the integrated box-type 3D printing device described above, the support structure is provided with two parallel first rack rails, and the first bracket is provided with a first drive motor and a first transmission component, wherein the first transmission component comprises a reducer, a coupling, a transmission shaft and a first transmission gear which are respectively located at two sides of the reducer, the coupling is connected with the reducer, the transmission shaft is connected with the first transmission gear, and the first drive motor drives the first bracket to move through the engagement between the first transmission gear and the first rack rail.

According to the integrated box-type 3D printing device described above, the third bracket is provided with a second rack rail, and the second bracket is provided with a second drive motor and a second transmission component, wherein the second transmission component includes a second transmission gear, and the second drive motor drives the second bracket to move through the engagement between the second transmission gear and the second rack rail.

According to the integrated box-type 3D printing device described above, the second bracket is provided with a third rack rail, and the printer body is provided with a third drive motor and a third transmission component, wherein the third transmission component includes a third transmission gear, and the third drive motor drives the printer body to move through the engagement between the third transmission gear and the third rack rail.

According to the integrated box-type 3D printing device described above, the integrated box-type 3D printing device includes a sliding frame, the second drive motor is arranged on the sliding frame, and the sliding frame is connected with the second bracket through a first connecting piece and a second connecting piece, and the first connecting piece is detachably linked with the second bracket.

According to the integrated box-type 3D printing device described above, the first connecting piece is a bolt and a nut, and the second connecting piece is a hinge.

According to the second aspect of the present invention, an integrated box-type 3D printing system is provided, which includes the integrated box-type 3D printing device as described above.

The integrated box-type 3D printing device of the present invention comprises a support structure, a first bracket, a second bracket and a printer body, wherein the first bracket can move along the first direction on the support structure, the printer body is arranged on the second bracket, the second bracket can move along the second direction relative to the first bracket, and the printer body can move along the third direction on the second bracket, thereby realizing the three-dimensional printing of the printer body. The support structure has a space for accommodating the second bracket, and the second bracket can be folded about an axis parallel to the first direction so that the second bracket can be placed in the accommodating space. The second bracket of the integrated box-type 3D printing device can be folded and placed in the accommodating space, thereby saving space, facilitating transportation, reducing waiting and handling time and workload, and increasing printing efficiency.

In order to explain the embodiments of the present invention or the technical effects in the prior art more clearly, the drawings that need to be used in the description of the embodiments or the prior art will be briefly described.

Obviously, the shown drawings discussed in the following description are some embodiments of the present invention, and for those skilled in the art, other embodiments and respective drawings can be prepared based these shown drawings without requiring an inventive activity and therefore without departing from the spirit of the invention.

DETAILED DESCRIPTION OF THE DRAWINGS

In order to make clearer the purpose, technical effects and advantages of the embodiments of the present invention, the technical effects of the embodiments of the present invention will be described clearly and completely with reference to the drawings of the embodiments of the present invention. Obviously, the described embodiments are part of the embodiments of the present invention, but not all of them.

Based on the embodiments of the present invention, all other embodiments and variations obtained by those skilled in the art without further inventive activity are encompassed in the present invention.

In the description of the present invention, it should be understood that the terms "include" and "have" and their variations used herein are intended to cover non-exclusive inclusions, for example, the processes, methods, systems, products or devices that include a series of steps or units are not necessarily limited to those steps or units explicitly listed, but may include other steps or units that are not explicitly listed or inherent to these processes, methods, products or equipment.

In the description of the embodiments of the present invention, it should be noted that the orientation or positional relationship indicated by the terms "upper" or "lower" is based on that shown in the drawings, such terms are only used for description and simplified description of the present invention other than to indicate or imply that the devices or components involved must be constructed and operated in such specific orientations, and therefore, cannot be understood as the limitations for the present invention. In addition, the terms "first" and "second" are used for descriptive purposes only and are not to be understood to indicate or imply relative importance or to imply the quantity of indicated technical features.

The integrated box-type 3D printing device and system provided by the present invention will be introduced in detail with specific embodiments.

Embodiment 1

Figure 2:
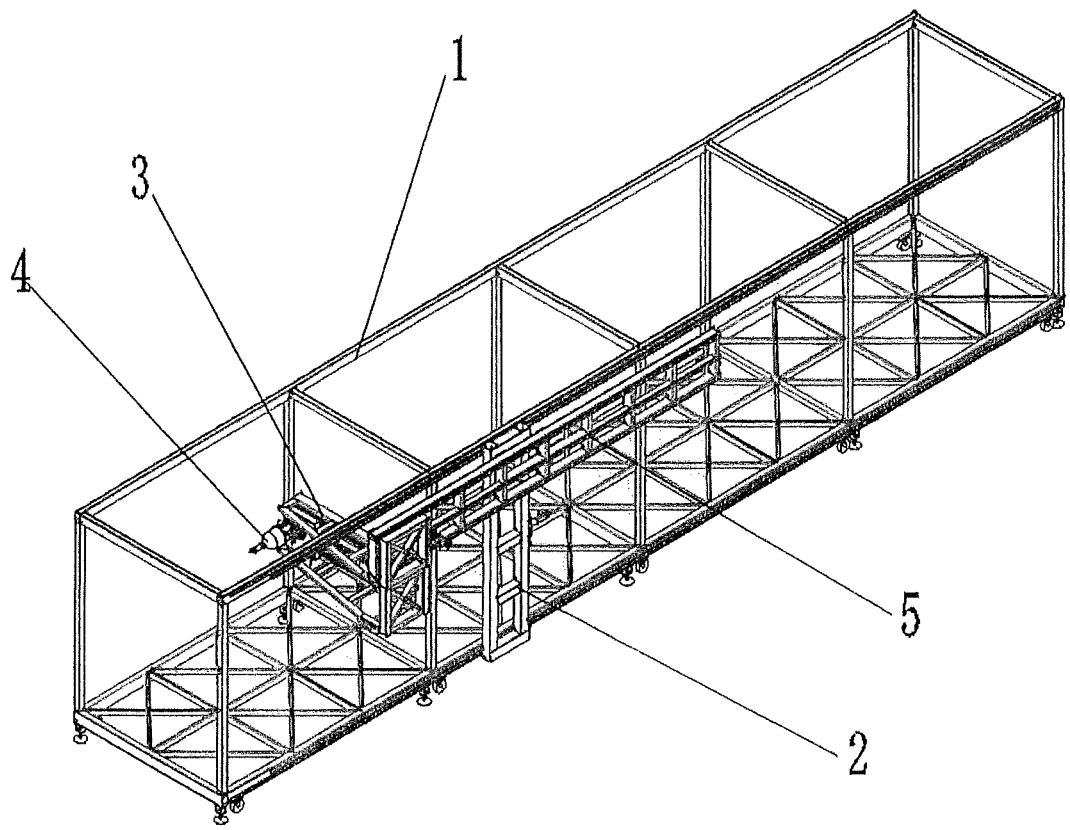
FIG. 2 is a schematic structural diagram of an integrated box-type 3D printing device provided by an embodiment of the present invention in the transportation state.
Figure 2:
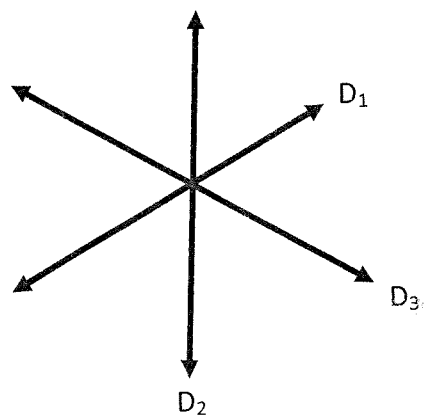

FIG. 1 is a schematic structural diagram of the integrated box-type 3D printing device provided by the embodiment of the present invention in the use state, and FIG. 2 is a schematic structural diagram of the integrated box-type 3D printing device provided by the embodiment of the present invention in the transportation state. Referring to FIGS. 1 and 2, this embodiment provides an integrated box-type 3D printing device, which includes a support structure 1, a first bracket 2, a second bracket 3, and a printer body 4.

The first bracket 2 can move back and forth or depending on orientation up and down in the first direction ($D_1$) on the support structure 1, the printer body 4 is arranged on the second bracket 3, the second bracket 3 can move back and forth or depending on orientation up and down in the second direction ($D_2$) relative to the first bracket 2, the printer body 4 can move back and forth in the third direction ($D_3$) on the second bracket, the support structure 1 has a space for accommodating the second bracket 3, the second bracket 3 can be folded about an axis parallel to the first direction ($D_1$) so that the second bracket 3 can be placed in the accommodating space, the second direction ($D_2$) is perpendicular to the first direction ($D_1$), and the third direction ($D_3$) is perpendicular to the first direction ($D_1$).

The support structure 1 of the integrated box-type 3D printing device in this embodiment is used to support the first bracket 2, the second bracket 3 and the printer body 4 and this embodiment does not particularly limit the specific form of the support structure 1. For example, it can be a box-type structure or a frame-type structure, which is generally used as the carrier of the feeding system.

In this embodiment, the first bracket 2 has a first length and a second length, the first length of the first bracket being longer than the second length of the first bracket. The first bracket 2 of the integrated box-type 3D printing device can slide along the support structure 1 in the first direction ($D_1$), and this embodiment does not particularly limit the specific structure of the first bracket 2 and the driving structure of the first bracket 2. In this embodiment, the second bracket 3 is used to mount the printer body 4, and can move in the second direction ($D_2$) relative to the first bracket 2, the printer body 4 can move in the third direction ($D_3$) on the second bracket 3, and this embodiment does not particularly limit the specific structure of the second bracket 3, the driving mode of the second bracket 3 and the driving structure of the printer body 4. In this embodiment, the first direction ($D_1$), the second direction ($D_2$), and the third direction ($D_3$) can be three directions perpendicular to each other in the three-dimensional Cartesian coordinate system.

In this embodiment, the printer body 4 can move along the third direction ($D_3$) on the second bracket 3, thus realizing three-dimensional printing of the printer body 4. When the printer body 4 does not work, the second bracket 3 can be folded and accommodated in the accommodating space of the support structure, thereby saving space and facilitating transportation.

The integrated box-type 3D printing device of this embodiment includes a support structure 1, a first bracket 2 having a first length and a second length, the first length of the first bracket 2 being longer than the second length of the first bracket, a second bracket 3 and a printer body 4, wherein the first bracket 2 can move along a first direction ($D_1$) on the support structure 1, the printer body 4 is arranged on the second bracket 3, the second bracket 3 can move along a second direction ($D_2$) relative to the first bracket, and the printer body 4 can move along a third direction ($D_3$) on the second bracket 3, so as to realize three-dimensional printing of the printer body. The support structure is provided with a space for accommodating the second bracket 3, and the second bracket 3 can be folded and placed in the accommodating space, thereby saving space, facilitating transportation, reducing waiting and handling time and workload, and increasing printing efficiency.

Figure 3:
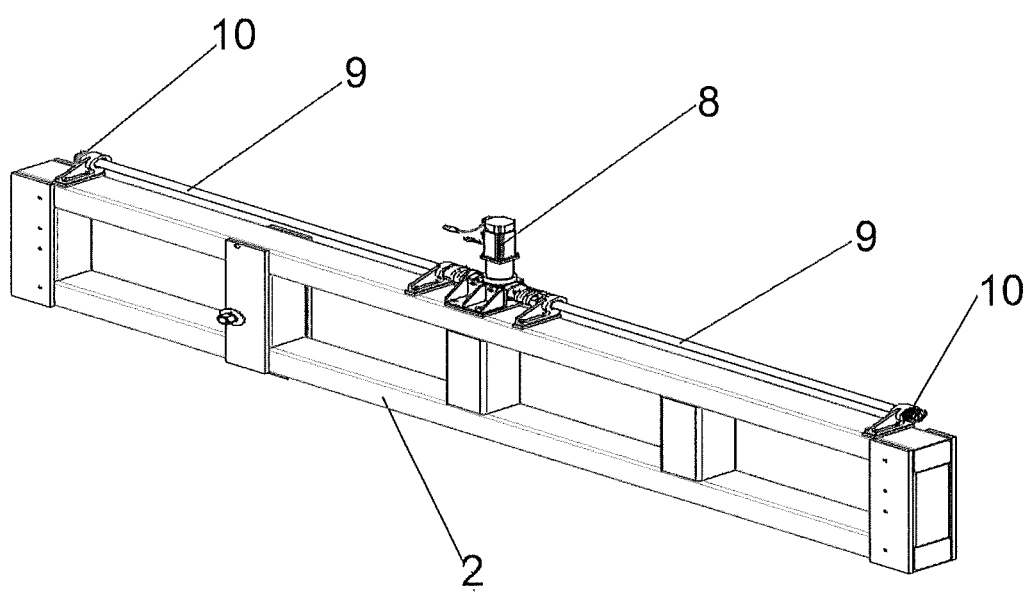
FIG. 3 is a schematic structural diagram of the first bracket of the integrated box-type 3D printing device provided by an embodiment of the present invention.
Figure 4:
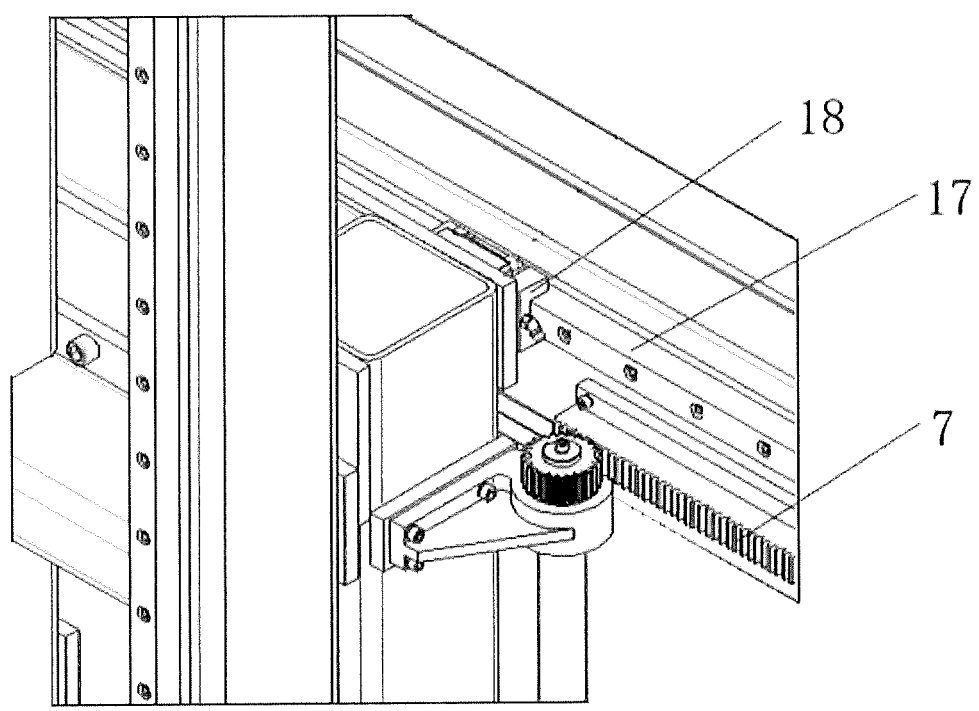
FIG. 4 is a partial schematic structural diagram of the integrated box type 3D printing device provided by an embodiment of the present invention.
Figure 5:
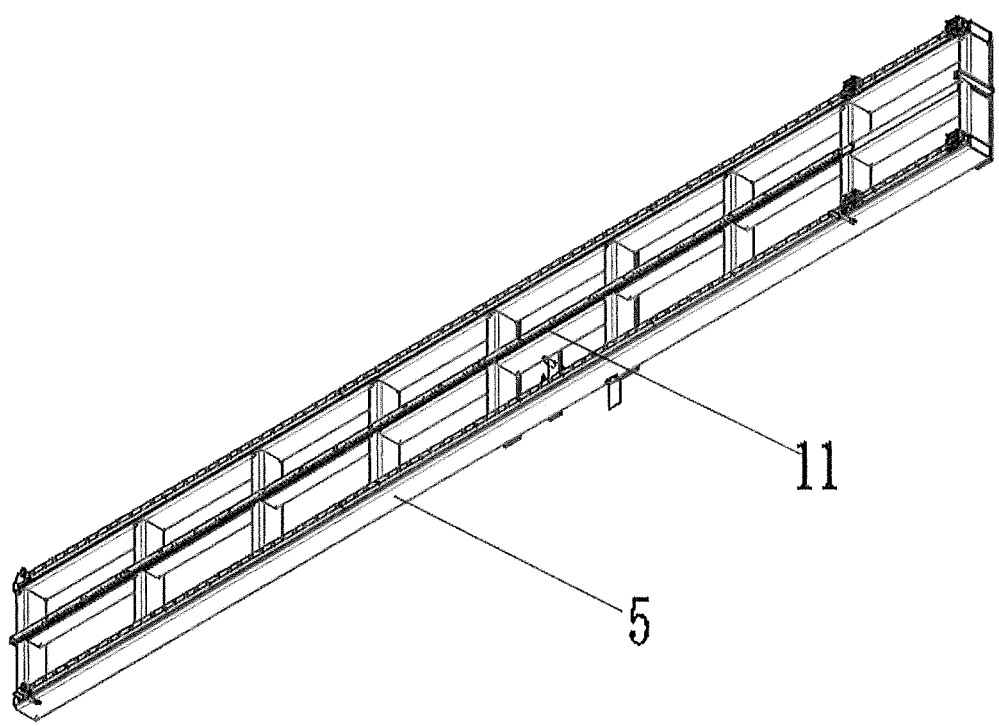
FIG. 5 is a schematic structural diagram of the third bracket of the integrated box-type 3D printing device provided by an embodiment of the present invention.

FIG. 3 is a schematic structural diagram of the first bracket 2 of the integrated box-type 3D printing device provided by this embodiment of the present invention;

FIG. 4 is a partial schematic structural diagram of the integrated box-type 3D printing device provided by this embodiment of the present invention;

FIG. 5 is a schematic structural diagram of the third bracket 5 of the integrated box-type 3D printing device provided by this embodiment of the present invention.

Referring to FIGS. 1 to 5, preferably, this embodiment also includes a third bracket 5 having a first length and a second length, the first length of the third bracket being longer than the second length of the third bracket, and wherein the first length of the third bracket is longer than the first length of the first bracket. When the integrated box-type 3D printing device is printing, the first length of the third bracket 5 is parallel to the second direction ($D_2$), thereby expanding the printing range of the integrated box-type 3D printing device in the second direction ($D_2$). When the integrated box-type 3D printing device is transported, the first length of the third bracket 5 is parallel to he first direction ($D_1$). In the transportation embodiment, the space occupied by the integrated box-type 3D printing device can be reduced by rotating the third bracket 5, making the device convenient for transportation.

Preferably, the support structure 1 in this embodiment further comprises a roller 6 and a fixed base, and the roller 6 and the base are arranged at the bottom of the support structure 1. The roller 6 is used to make it convenient to move and transport the integrated box-type 3D printing device, and the fixed base is used for carrying the support structure 1.

Preferably, this embodiment also includes a feeding system, wherein the support structure is a box-type structure, the feeding system is arranged in the box-type structure, and the feeding system provides raw materials for the printer body 4. In this embodiment, the support structure 1 is the carrier of the feeding system.

Referring to FIG. 3, specifically, the support structure 1 is provided with two parallel first rack rails 7 fixed on the support structure 1, and the first bracket 2 is provided with a first drive motor 8 and a first transmission component, wherein the first transmission component includes a reducer, and a coupling, a transmission shaft 9 and a first transmission gear 10 located at both sides of the reducer respectively, wherein the coupling is connected with the reducer, the transmission shaft 9 is connected with the first transmission gear 10, and the first drive motor 8 drives the first bracket 2 to move through the engagement between the first transmission gear 10 and the first rack rail 7. In this embodiment, two parallel first rack rails 7 are set, and the first bracket 2 translates on the first rack rails 7, thereby improving the stability of the first bracket 2.

Referring to FIG. 4, in this embodiment, the support structure 1 is provided with the first linear guide rail 17 parallel to the first rack rail 7, and the first bracket 2 is provided with the first sliding block 18 matched with the linear guide rail, wherein the first sliding block 18 moves linearly along the first linear guide rail 17 to guide the first bracket 2 to linearly reciprocate in the first direction ($D_1$), and both ends of the first linear guide rail 17 are provided with stoppers limiting the first sliding block 18.

Figure 6:
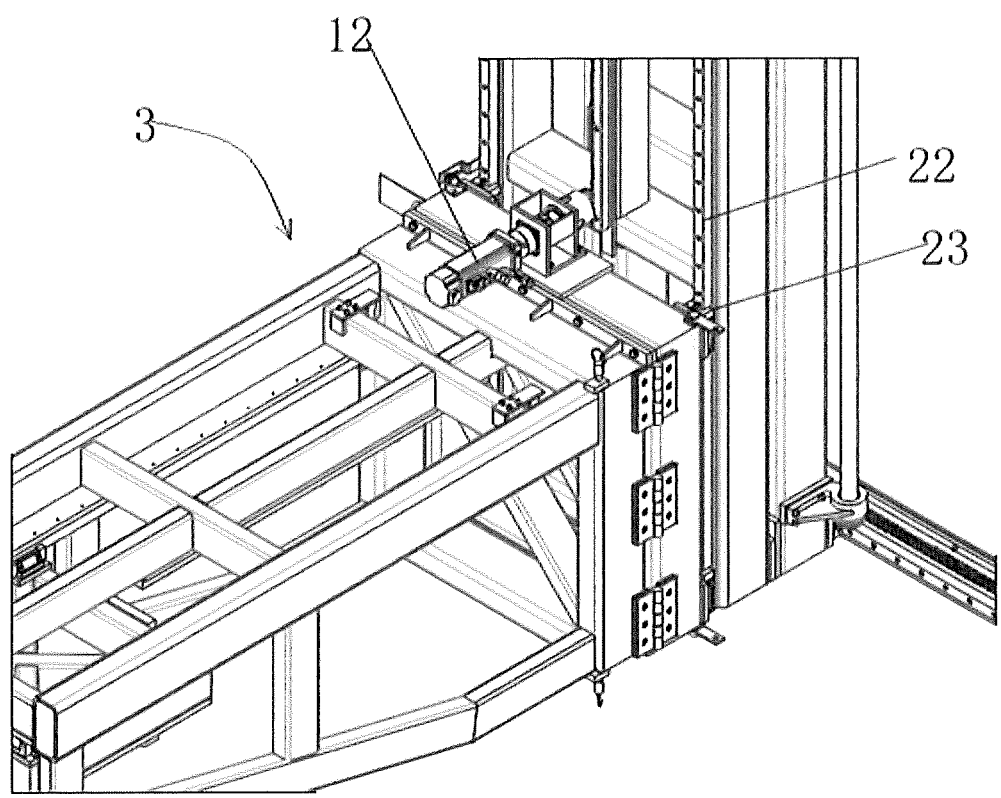
FIG. 6 is a partial schematic structural diagram of the integrated box-type 3D printing device provided by an embodiment of the present invention.
Figure 7:
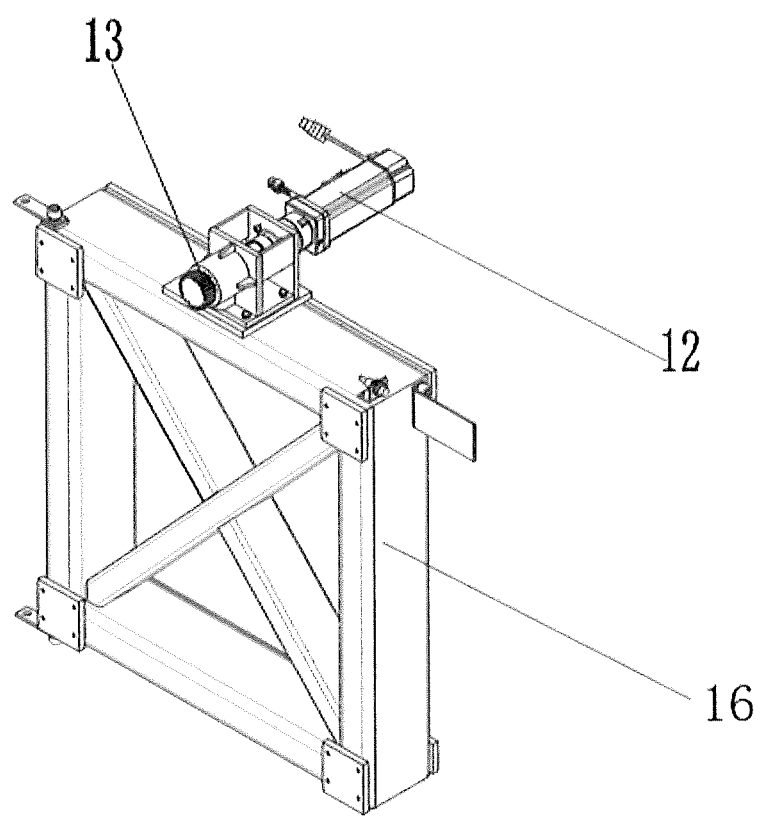
FIG. 7 is a partial schematic structural diagram of the integrated box-type 3D printing device provided by an embodiment of the present invention.

FIG. 6 is a partial schematic structural diagram of the integrated box-type 3D printing device provided by this embodiment of the present invention, and FIG. 7 is a partial schematic structural diagram of the integrated box-type 3D printing installation provided by this embodiment of the present invention.

Referring to FIGS. 5 to 7, specifically, the third bracket 5 is provided with a second rack rail 11, and the second bracket 3 is provided with a second drive motor 12 and a second transmission component, wherein the second transmission component includes a second transmission gear 13, and the second drive motor 12 drives the second bracket 3 to move through the engagement between the second transmission gear 13 and the second rack rail 11.

In this embodiment, the third bracket 5 is provided with a second linear guide rail 22 parallel to the second rack rail 11, and the second bracket 3 is provided with a second sliding block 23 matched with the second linear guide rail 22, wherein the second sliding block 23 moves linearly along the second linear guide rail 22 to guide the second bracket 3 to linearly reciprocate, and both ends of the second linear guide rail 22 are provided with stoppers limiting the second sliding block 23.

Figure 8:
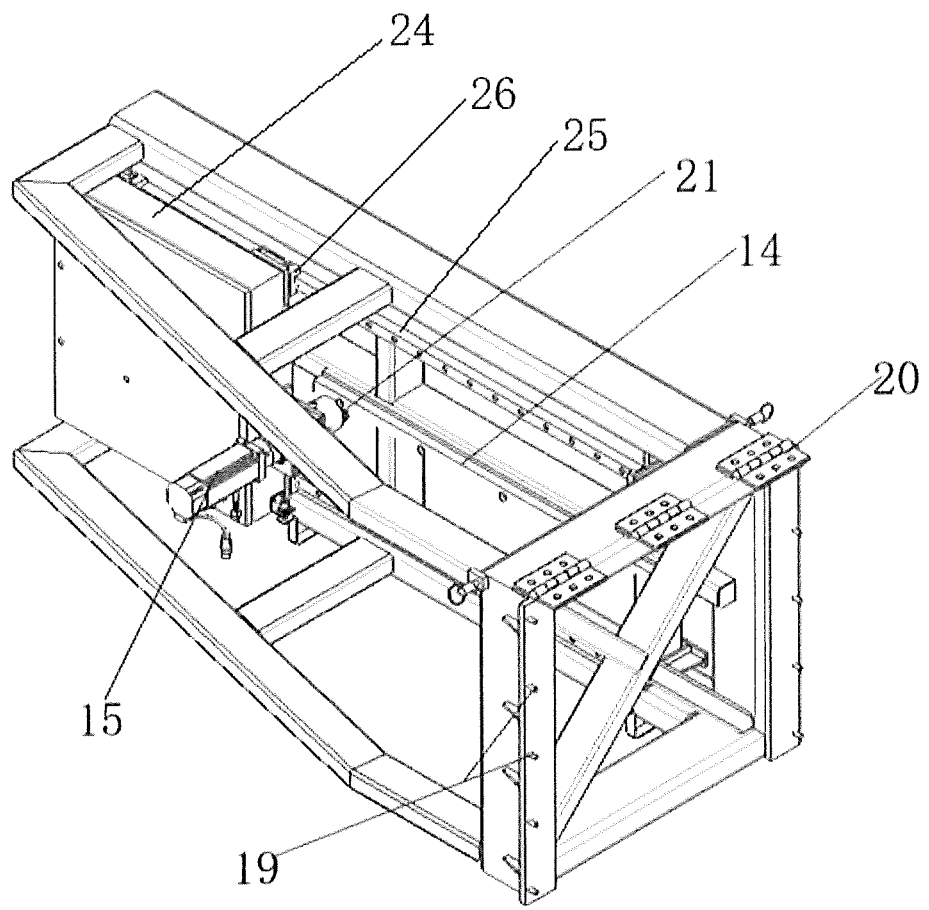
FIG. 8 is a structural diagram of the second bracket of the integrated box-type 3D printing device provided by an embodiment of the present invention.

FIG. 8 is a schematic structural diagram of the second bracket of the integrated box-type 3D printing device provided by this embodiment of the present invention from a visual angle. Referring to FIGS. 6 to 8, specifically, the second bracket 3 is provided with a third rack rail 14, the printer body 4 is provided with a third drive motor 15 and a third transmission component, the third transmission component comprises a third drive gear 21, and the third drive motor 15 drives the printer body 4 to move through the engagement between the third drive gear 21 and the third rack rail 14.

In this embodiment, the third drive motor 15 and the printer body 4 are arranged on the first sliding frame 24, the second bracket 3 is provided with a third linear guide rail 25, and the first sliding frame 24 is provided with a third sliding block 26 matched with the third linear guide rail 25. The third sliding block 26 moves linearly along the third linear guide rail 25, thereby guiding the printer body 4 to move linearly in the third direction ($D_3$); both ends of the third linear guide rail 25 are provided with stoppers limiting the third sliding block 26.

In this embodiment, the movement of the first bracket 2, the second bracket 3 and the printer body 4 are all realized by gear transmission which has advantages of high transmission accuracy, reliable work and long service life.

Preferably, the integrated box-type 3D printing device includes a second sliding frame 16, the second drive motor 12 is arranged on the second sliding frame 16, the second sliding frame 16 is connected with the second bracket 3 through a first connecting piece 19 and a second connecting piece 20, and the first connecting piece 19 is detachably linked with the second bracket 3. Preferably, the first connecting piece 19 is a bolt and a nut, the second connecting piece 20 is a hinge. In this embodiment, the second drive motor 12 is arranged on the second sliding frame 16, and when the integrated box-type 3D printing device is in use, the second sliding frame 16 is fixedly connected with the second bracket 3 through the first connecting piece 19. As the second sliding frame 16 is hinged with the second bracket 3 through the second connecting piece 20, the first connecting piece 19 is first removed when the second bracket 3 is folded, and then the second bracket 3 is folded along the rotation axis of the hinge, so that the second bracket 3 can be placed in the accommodating space of the support structure, wherein the second sliding frame 16 and the second drive motor 12 do not fold with the second bracket, which is convenient to operate.

Embodiment 2

This embodiment provides an integrated box-type 3D printing system, which includes the integrated box-type 3D printing device described in Embodiment 1.

For example, the integrated box-type 3D printing device includes a support structure 1, a first bracket 2, a second bracket 3, and a printer body 4. The first bracket 2 can move along a first direction ($D_1$) on the support structure 1, the printer body 4 is arranged on the second bracket 3, the second bracket 3 can move along a second direction ($D_2$) relative to the first bracket 2, the printer body 4 can move along a third direction ($D_3$) on the second bracket 3, the support structure 1 is provided with a space for accommodating the second bracket 3, the second bracket 3 can be folded about an axis parallel to the first direction ($D_1$) so that the second bracket 3 can be placed in the accommodating space, the second direction ($D_2$) is perpendicular to the first direction ($D_1$), and the third direction ($D_3$) is perpendicular to the first direction ($D_1$).

The first bracket 2 of the integrated box-type 3D printing device of the integrated box-type 3D printing system of this embodiment can move along the first direction ($D_1$) on the support structure 1, the printer body 4 is arranged on the second bracket 3, the second bracket 3 can move along the second direction ($D_2$) relative to the first bracket 2, and the printer body 4 can move along the third direction ($D_3$) on the second bracket 3, thereby realizing three-dimensional printing of the printer body 4. The support structure 1 is provided with a space for accommodating the second bracket. The second bracket 3 can be folded about an axis parallel to the first direction ($D_1$) so as to be placed in the accommodation space. The second bracket 3 of the integrated box-type 3D printing device can be folded and placed in the accommodation space, thus saving space, facilitating transportation, reducing waiting and handling time and workload, and increasing printing efficiency.

Finally, it should be noted that the above embodiments are only used to describe the technical effects of the present invention other than to limit it. Although the present invention has been described in detail with reference to the above embodiments, those skilled in the art should understand that they can still modify the shown and described embodiments, or make equivalent substitutions of some or all of the technical features. However, these modifications or substitutions do not make the essence of the corresponding technical effects deviate from the scope of the technical effects of the embodiments of the present invention.

Description of Reference Numbers $D_1$ First direction
$D_2$ Second direction
$D_3$ Third direction
1 Support structure
2 First bracket
3 Second bracket
4 Printer body
5 Third bracket
6 Roller
7 First rack rail
8 First drive motor
9 Transmission shaft
10 First transmission gear
11 Second rack rail
12 Second drive motor
13 Second transmission gear
14 Third rack rail
15 Third drive motor
16 Second sliding frame
17 First linear guide rail
18 First sliding block
19 First connecting piece
20 Second connecting piece
21 Third transmission gear
22 Second linear guide rail
23 Second sliding block
24 First sliding frame
25 Third linear guide rail
26 Third sliding block.

What is claimed is:

1. An integrated box-type 3D printing device, comprising:
   a support structure;
   a first bracket;
   a second bracket; and
   a printer body; wherein
   the first bracket is movable back and forth in a first direction on the support structure;
   the printer body is arranged on the second bracket;
   the second bracket is movable back and forth in a second direction relative to the first bracket;
   the printer body is movable back and forth in a third direction on the second bracket;
   the support structure is provided with an accommodating space for accommodating the second bracket; and
   the second bracket is foldable in the opposite direction to the third direction so that the second bracket is foldable into the accommodating space so that the integrated box-type 3D printing device assumes a transport and storage configuration when the second bracket is folded into the accommodating space.

2. The integrated box-type 3D printing device according to claim 1, further comprising:

a third bracket whose height in the second direction is greater than that of the first bracket in the second direction; wherein when the integrated box-type 3D printing device is used, the height direction of the third bracket is parallel to the second direction, and the second bracket is movable back and forth in the second direction on the third bracket; and when the integrated box-type 3D printing device is stored or transported, the height direction of the third bracket is parallel to that of the first bracket.

3. The integrated box-type 3D printing device according to claim 1, wherein the support structure further comprises a roller and a fixed base, both of which being arranged at the bottom of the support structure.

4. The integrated box-type 3D printing device according to claim 2, wherein the support structure is provided with two parallel first rack rails; and the first bracket is provided with a first drive motor and a first transmission assembly; wherein the first transmission assembly comprises a reducer, a coupling, a transmission shaft and a first transmission gear that are respectively located at two sides of the reducer; wherein the coupling is connected with the reducer, the transmission shaft is connected with the first transmission gear, and the first drive motor drives the first bracket to move through the engagement of the first transmission gear with the first rack rail.

5. The integrated box-type 3D printing device according to claim 4, wherein:

the third bracket is provided with a second rack rail;

the second bracket is provided with a second drive motor and a second transmission assembly;

the second transmission assembly includes a second transmission gear; and the second drive motor drives the second bracket to move through the engagement of the second transmission gear with the second rack rail.

6. The integrated box-type 3D printing device according to claim 5, wherein the second bracket is provided with a third rack rail; and the printer body is provided with a third drive motor and a third transmission assembly; wherein the third transmission assembly includes a third transmission gear; and the third drive motor drives the printer body to move through the engagement of the third transmission gear with the third rack rail.

7. The integrated box-type 3D printing device according to claim 6, wherein the second bracket includes a sliding frame;

the second drive motor is arranged on the sliding frame;

the sliding frame is connected with the second bracket through a first connecting piece and a second connecting piece; and the first connecting piece is detachably linked with the second bracket.

8. The integrated box-type 3D printing device according to claim 7, wherein the first connecting piece comprises a bolt and nut; and the second connecting piece is a hinge.

* * * * *